United States Patent
Takeno

(10) Patent No.: US 10,867,485 B2
(45) Date of Patent: Dec. 15, 2020

(54) MERCHANDISE REGISTRATION DEVICE AND MERCHANDISE REGISTRATION PROGRAM

(71) Applicant: TOSHIBA TEC KABUSHIKI KAISHA, Tokyo (JP)

(72) Inventor: Yuishi Takeno, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/411,462

(22) Filed: May 14, 2019

(65) Prior Publication Data
US 2019/0266855 A1 Aug. 29, 2019

Related U.S. Application Data

(63) Continuation of application No. 15/672,962, filed on Aug. 9, 2017, now Pat. No. 10,332,362.

(30) Foreign Application Priority Data

Sep. 15, 2016 (JP) .................................. 2016-180429

(51) Int. Cl.
*G07G 1/00* (2006.01)
*G06K 9/00* (2006.01)
*G06Q 20/20* (2012.01)

(52) U.S. Cl.
CPC ....... *G07G 1/0063* (2013.01); *G06K 9/00671* (2013.01); *G06Q 20/208* (2013.01); *G07G 1/0009* (2013.01)

(58) Field of Classification Search
CPC ..... G06K 9/00671; G07G 1/0063; G07G 1/12
See application file for complete search history.

(56) References Cited

U.S. PATENT DOCUMENTS

| 6,332,573 B1 | 12/2001 | Gu et al. |
| 2005/0231370 A1 | 10/2005 | Tagato |

(Continued)

FOREIGN PATENT DOCUMENTS

EP    3002739 A2    4/2016

OTHER PUBLICATIONS

Anonymous: "Histogram of oriented gradients—Wikipedia, the free encyclopedia", Dec. 28, 2015, Retrieved from the Internet: URL:https://en.wikipedia.org/w/index.php?title=Histogram_of_oriented_gradients&printable=yes [retrieved on Jun. 21, 2016], 6 pages.

(Continued)

*Primary Examiner* — Seung H Lee
(74) *Attorney, Agent, or Firm* — Kim & Stewart LLP

(57) ABSTRACT

A merchandise registration device according to an embodiment includes an image capturing unit that captures an image of a merchandise item. A memory stores a merchandise recognition dictionary. A processor determines whether a merchandise identification code can be extracted from the captured image. If the merchandise identification code cannot be extracted from the captured image, the processor identifies, based on the captured image, whether the merchandise item in the captured image is a first merchandise type having a merchandise identification code or a second merchandise type without the merchandise identification code. If the merchandise item is identified as the second merchandise type, the processor performs a merchandise recognition process including calculating feature data from the captured image and recognizing the merchandise item by comparing the calculated feature data to the merchandise recognition dictionary. The processor performs a registration process for a transaction with respect to the recognized merchandise item.

20 Claims, 5 Drawing Sheets

(56) References Cited

U.S. PATENT DOCUMENTS

2011/0220720 A1   9/2011  Naito et al.
2014/0140574 A1   5/2014  Takeno
2016/0086149 A1   3/2016  Yuyama

OTHER PUBLICATIONS

Communication pursuant to Article 94(3) EPC dated Jul. 30, 2019 in corresponding European Patent Application No. 17190478.2, 8 pages.
Hou et al.: "Fruit recognition based on convolution neural network", 2016 12th International Conference on Natural Computation, Fuzzy Systems and Knowledge Discovery (ICNC-FSKD), IEEE, Aug. 13, 2016, pp. 18-22.
Extended European Search Report dated Nov. 17, 2017 in corresponding European Patent Application No. 17190478.2, 9 pages.

MERCHANDISE REGISTRATION DEVICE AND MERCHANDISE REGISTRATION PROGRAM

CROSS-REFERENCE TO RELATED APPLICATION

This application is a continuation of U.S. patent application Ser. No. 15/672,962, filed Aug. 9, 2017, which application is based upon and claims the benefit of priority from Japanese Patent Application No. 2016-180429, filed Sep. 15, 2016, the entire contents of which are incorporated herein by reference.

FIELD

Embodiments described herein relate generally to a merchandise registration device and a merchandise registration program.

BACKGROUND

A POS terminal that manages sales information is generally used in a retail store and the like. In addition, a merchandise registration device which registers merchandise necessary for accounting in the POS terminal is also in practical use in general. For example, the merchandise registration device recognizes merchandise by reading a merchandise identification code on the merchandise. In addition, a merchandise registration device may perform automatic confirmation for recognizing merchandise which is captured as an image, based on the image of the merchandise and a merchandise recognition dictionary having feature data corresponding to an image of each merchandise stored in advance.

DETAILED DESCRIPTION

The above-described automatic confirmation is a method of automatically specifying merchandise with the highest similarity between feature data calculated from the image and feature data previously stored in a merchandise recognition dictionary, and thus, there is a possibility that misrecognition occurs. The merchandise includes an article on which a merchandise identification code is provided and an article on which the merchandise identification code is not provided. In order to prevent misrecognition from occurring, it is preferable that the merchandise on which the merchandise identification code is provided is recognized by reading the merchandise identification code.

An exemplary embodiment provides a merchandise registration device and a merchandise registration program which can recognize and register merchandise with high accuracy.

A merchandise registration device according to an embodiment includes an image capturing unit that captures an image of a merchandise item. A memory stores a merchandise recognition dictionary having feature data corresponding to each of a plurality of merchandise items. A processor determines whether a merchandise identification code can be extracted from the captured image. If the merchandise identification code cannot be extracted from the captured image, the processor identifies, based on the captured image, whether the merchandise item in the captured image is a first merchandise type on which a merchandise identification code for identifying the merchandise item is provided or a second merchandise type on which the merchandise identification code is not provided. If the merchandise item is identified as the second merchandise type, the processor performs a merchandise recognition process including calculating feature data from the captured image and recognizing the merchandise item by comparing the calculated feature data and the stored feature data in the merchandise recognition dictionary. The processor performs a registration process for a transaction with respect to the merchandise item recognized by the merchandise recognition process.

Hereinafter, a merchandise registration device and a merchandise registration program according to one embodiment will be described with reference to the drawings.

First Embodiment

Figure 1:
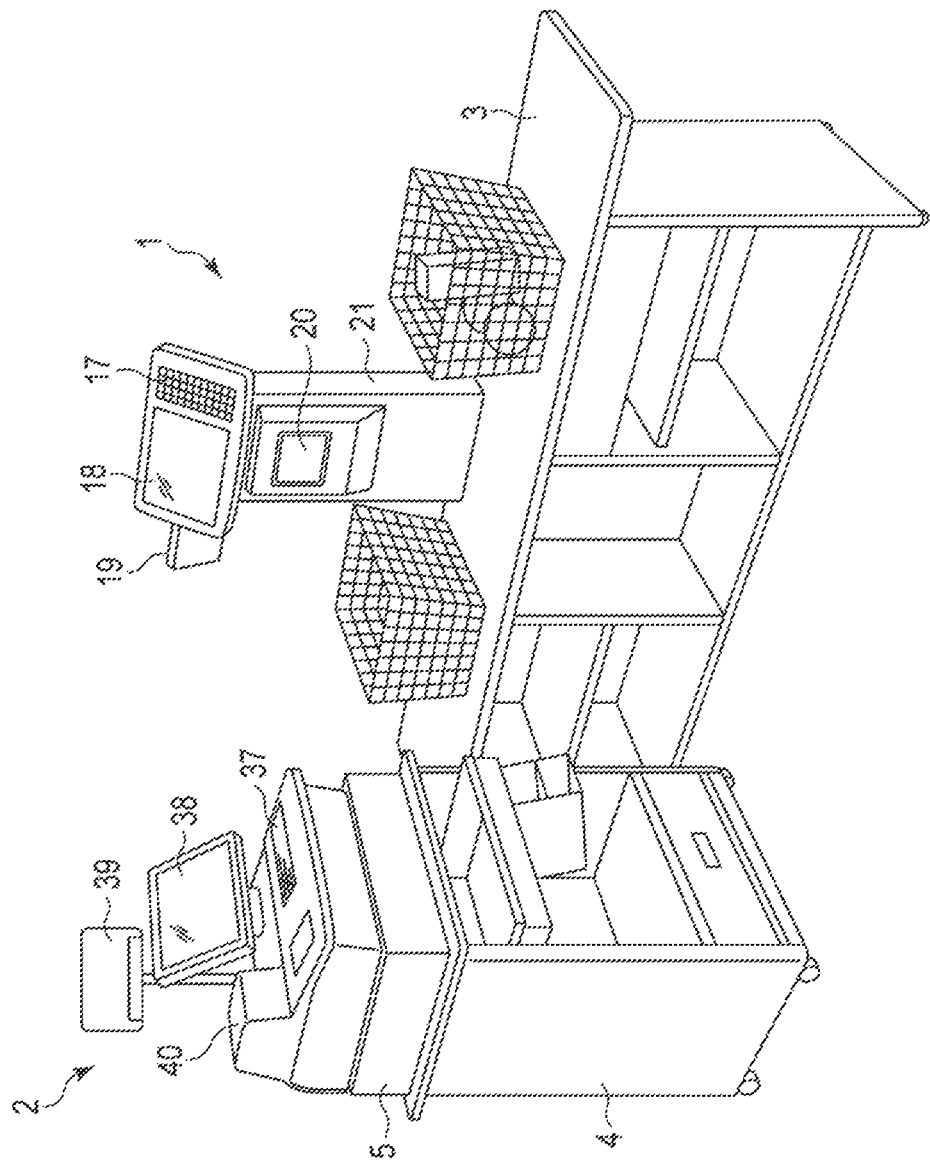
FIG. 1 is a perspective view illustrating an example of a merchandise registration device and a POS terminal according to a first embodiment.
Figure 2:
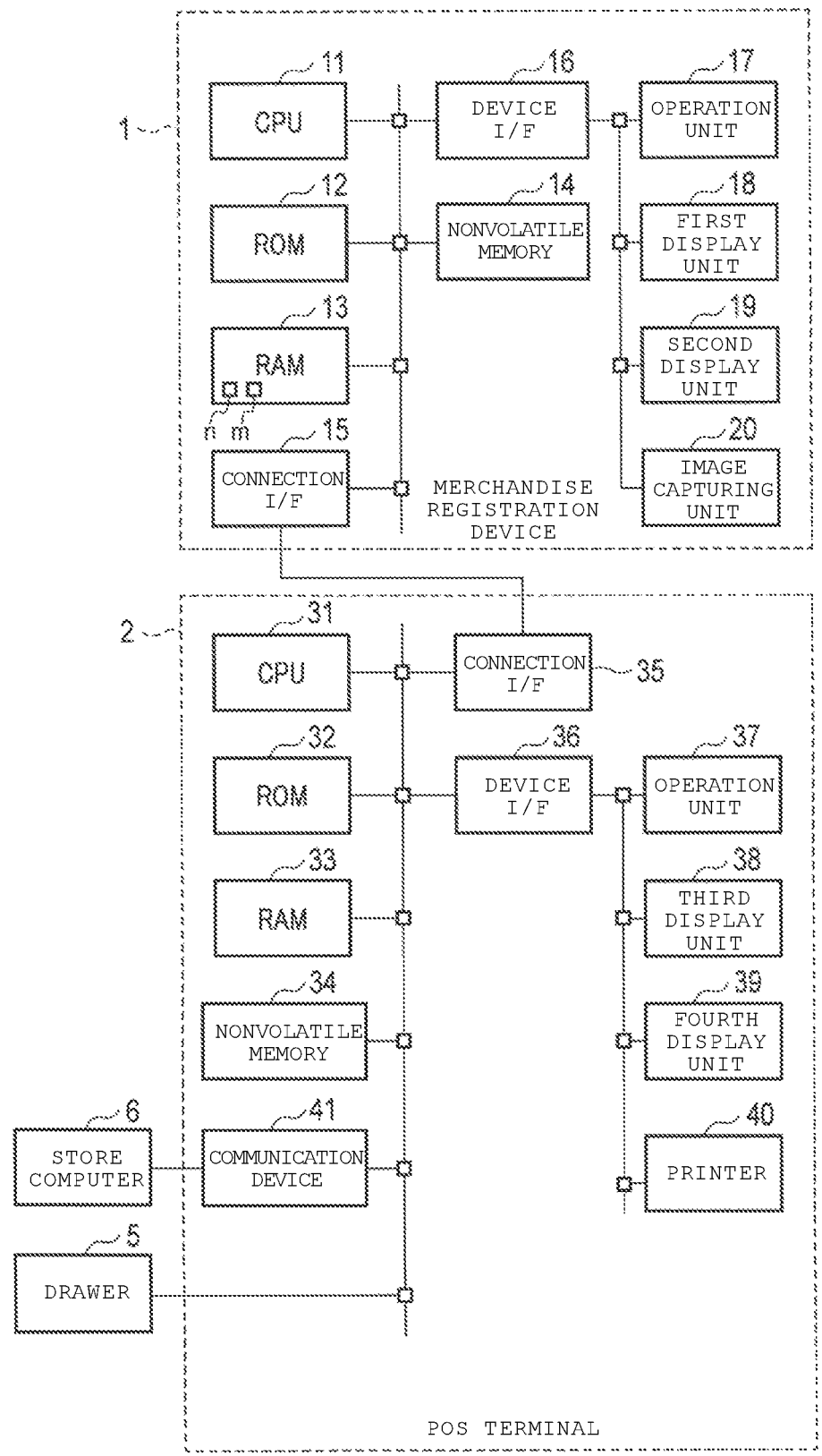
FIG. 2 is a diagram illustrating an example configuration of the merchandise registration device and the POS terminal.

First, a merchandise registration device 1 according to a first embodiment will be described. FIGS. 1 and 2 illustrate example configurations of a merchandise registration device 1 and a point of sales (POS) terminal 2 according to the first embodiment. FIG. 1 is a perspective view illustrating an example of the merchandise registration device 1 and the POS terminal 2. FIG. 2 illustrates an example configuration of the merchandise registration device 1 and the POS terminal 2. The merchandise registration device 1 and the POS terminal 2 are used for sales registration and accounting in a store such as a retail store. The merchandise registration device 1 and the POS terminal 2 are connected to each other by a cable (not illustrated) or wirelessly.

The merchandise registration device 1 acquires an image from merchandise, recognizes the merchandise based on the acquired image, and registers the recognized merchandise in the POS terminal 2 as merchandise for accounting in a transaction. The merchandise registration device 1 is positioned on, for example, an accounting counter 3. The merchandise registration device 1 recognizes the merchandise by acquiring a merchandise identification code for identifying the merchandise. The merchandise identification code is included in a pattern such as a barcode or a two-dimensional code, and is affixed to the merchandise. For example, the merchandise registration device 1 recognizes the merchandise by reading the merchandise identification code provided on the merchandise. In addition, for example, the merchandise registration device 1 acquires an image of the appearance of the merchandise, refers to a dictionary (merchandise recognition dictionary) in which the feature data generated from the image of each merchandise is associated with the merchandise identification code, estimates the merchandise identification code corresponding to the merchandise reflected in the acquired image, thereby, recognizing the merchandise.

The merchandise registration device 1 refers to a table (merchandise table) in which the merchandise identification code, a merchandise name, and the price are associated with each other. Thus, the merchandise identification code of the recognized merchandise, the merchandise name, and the price are provided to the POS terminal 2. Thereby, the merchandise registration device 1 performs merchandise registration processing of registering the merchandise to a list of merchandise (accounting merchandise list) necessary for performing accounting of the transaction in the POS terminal 2.

As illustrated in FIGS. 1 and 2, the merchandise registration device 1 includes a CPU 11, a ROM 12, a RAM 13, a nonvolatile memory 14, a connection I/F 15, a device I/F 16, an operation unit 17, a first display unit 18, a second display unit 19, an image capturing unit 20, and a housing 21.

The CPU 11 is, for example, a processor that performs various types of processing. The CPU 11 performs the various types of processing based on data such as a program stored in the ROM 12. The CPU 11 executes the program stored in the ROM 12, thereby functioning as a control unit capable of performing various operations.

The ROM 12 is a read-only nonvolatile memory. The ROM 12 stores a program, data used for the program, and the like.

The RAM 13 is a volatile memory that functions as a working memory. The RAM 13 temporarily stores data or the like during processing of the CPU 11. In addition, the RAM 13 temporarily stores a program executed by the CPU 11.

The nonvolatile memory 14 is a storage medium capable of storing various types of information. The nonvolatile memory 14 stores a program, data used for the program, and the like. The nonvolatile memory 14 is, for example, a solid state drive (SSD), a hard disk drive (HDD), or other storage devices. Instead of the nonvolatile memory 14, a memory I/F such as a card slot into which a storage medium such as a memory card can be inserted may be provided. For example, the nonvolatile memory 14 may store a merchandise recognition dictionary, a merchandise table, and the like. In addition, for example, the nonvolatile memory 14 may store a program (merchandise registration program) for recognizing a merchandise by using the merchandise recognition dictionary and the merchandise table, and registering the recognized merchandise in the accounting merchandise list of the POS terminal 2. In addition, the nonvolatile memory 14 stores a merchandise type identification dictionary used for the merchandise registration program. The merchandise type identification dictionary will be described below.

The connection I/F 15 is an interface for communicating with other devices. The connection I/F 15 is used for communication with the POS terminal 2, for example. The connection I/F 15 is a connection terminal that conforms to communication standards such as the USB standard or the RS-232C standard. The connection I/F 15 may be a cable connectable to the POS terminal 2. In addition, the connection I/F 15 may perform wireless communication with the POS terminal 2 in accordance with a standard such as BLUETOOTH (registered trademark) or WI-FI (registered trademark).

The device I/F 16 is an interface for communicating with various components and the CPU 11. For example, the device I/F 16 is used for communication with the operation unit 17, the first display unit 18, the second display unit 19, the image capturing unit 20, and the like. The device I/F 16 is a connection terminal that conforms to communication standards such as the USB standard or the RS-232C standard.

The operation unit 17 generates an operation signal, based on an operation of an input device. The input device is, for example, a touch sensor, a numeric keypad, a keyboard, or the like. The touch sensor may be, for example, a resistive touch sensor, a capacitive touch sensor, or the like. The touch sensor acquires information indicating a designated position within a certain region. The touch sensor is configured as a touch panel integrated with the aforementioned first display unit 18, thereby, inputting a signal indicating a position touched on a screen displayed on the first display unit 18 to the CPU 11.

The first display unit 18 is a display device that displays a screen in accordance with a video signal input from the CPU 11 or a display control unit such as a graphic controller (not illustrated). A screen for an operator of the merchandise registration device 1 to confirm merchandise registration and the like is displayed in the first display unit 18.

The second display unit 19 is a display device that displays a screen in accordance with the video signal input from the CPU 11 or the display control unit such as a graphic controller (not illustrated). A screen for a user (customer) to confirm merchandise registration and the like is displayed in the second display unit 19.

The image capturing unit 20 is an image acquisition unit that acquires an image of merchandise. The image capturing unit 20 includes an image capturing device, a lens for forming a subject image on the image capturing device, and a drive circuit for driving the image capturing device. The image capturing unit 20 reads electric charges accumulated in the image capturing device by the drive circuit, thereby, acquiring an image corresponding to the subject image formed by the lens. The image capturing unit 20 can acquire the image of the merchandise in a case where the merchandise exists within an angle of view of the lens. The image capturing unit 20 acquires a plurality of sequential images (frames) by reading images from the image capturing device by using the drive circuit during a predetermined cycle. The image capturing unit 20 sequentially supplies the acquired images to the CPU 11.

The housing 21 contains or supports the CPU 11, the ROM 12, the RAM 13, the nonvolatile memory 14, the connection I/F 15, the device I/F 16, the operation unit 17, the first display unit 18, the second display unit 19, and the image capturing unit 20 of the merchandise registration device 1. The housing 21 is disposed on, for example, the accounting counter 3. The housing 21 supports the operation unit 17, the first display unit 18, and the image capturing unit 20 toward an operator side. In addition, the housing 21 supports the second display unit 19 toward a customer side.

The POS terminal 2 performs payment processing, based on the total amount of money of merchandise registered in the accounting merchandise list by the merchandise registration device 1 and the deposit amount received from a user (customer). The POS terminal 2 is positioned on, for example, a drawer 5 disposed on the register counter 4. The drawer 5 can be replaced with an automatic changer. The drawer 5 holds cash and coins and is opened or closed in accordance with control of the POS terminal 2. The POS terminal 2 includes a CPU 31, a ROM 32, a RAM 33, a nonvolatile memory 34, a connection I/F 35, a device I/F 36, an operation unit 37, a third display unit 38, a fourth display unit 39, a printer 40, and a communication device 41.

The CPU 31 is a processor that performs various types of processing. The CPU 31 performs the various types of processing, based on data such as a program stored in the ROM 32. The CPU 31 functions as a control unit capable of performing various operations by executing the program stored in the ROM 32.

The ROM 32 is a read-only nonvolatile memory. The ROM 32 stores a program, and data used for the program, and the like.

The RAM 33 is a volatile memory that functions as a working memory. The RAM 33 temporarily stores data or the like during processing of the CPU 31. In addition, the RAM 33 temporarily stores a program executed by the CPU 31. The RAM 33 stores, for example, the accounting merchandise list.

The nonvolatile memory 34 is a storage medium capable of storing various types of information. The nonvolatile memory 34 stores a program, and data used for the program, and the like. The nonvolatile memory 34 is, for example, a solid state drive (SSD), a hard disk drive (HDD), or other storage devices. Instead of the nonvolatile memory 34, a memory I/F such as a card slot into which the storage medium such as a memory card can be inserted may be provided.

The connection I/F 35 is an interface for communicating with other devices. For example, the connection I/F 35 is used for communicating with the merchandise registration device 1. The connection I/F 35 is a connection terminal with a configuration that conforms to certain communication standards such as the USB standard or the RS-232C standard. The connection I/F 35 may be a cable to connect to the merchandise registration device 1. In addition, the connection I/F 35 may perform wireless communication with the merchandise registration device 1 in accordance with a standard such as the Bluetooth (registered trademark) or the Wi-Fi (registered trademark).

The device I/F 36 is an interface for allowing various functional blocks to communicate with the CPU 31. For example, the device I/F 36 communicates with the operation unit 37, the third display unit 38, the fourth display unit 39, the printer 40, and the like. The device I/F 36 is a connection terminal with a configuration that conforms to certain communication standards such as the USB standard or the RS-232C standard.

The operation unit 37 generates an operation signal, based on an operation of an input device. The input device is, for example, a touch sensor, a numeric keypad, a keyboard, or the like. The touch sensor is, for example, a resistive touch sensor, a capacitive touch sensor, or the like. The touch sensor acquires information indicating a designated position within a certain region. The touch sensor is configured as a touch panel integrated with the aforementioned third display unit 38, thereby, inputting a signal indicating a position touched on a screen displayed on the third display unit 38 to the CPU 31.

The third display unit 38 is a display device that displays a screen in accordance with a video signal input from the CPU 31 or a display control unit such as a graphic controller (not shown). A screen for an operator of the POS terminal 2 to confirm merchandise registration and the like is displayed in the third display unit 38.

The fourth display unit 39 is a display device that displays a screen in accordance with the video signal input from the CPU 31 or a display control unit such as a graphic controller (not illustrated). A screen for a user (customer) to confirm merchandise registration and the like is displayed in the fourth display unit 39.

The printer 40 prints results of payment processing performed by the POS terminal 2 on a medium such as paper and outputs the medium. The printer 40 prints the results of the payment processing on the medium, based on control of the CPU 31.

The communication device 41 provides for communicating with other electronic apparatuses. For example, the communication device 41 communicates with a store computer 6 that receives the results of the payment processing performed by the POS terminal 2. The communication device 41 is configured to perform communication and conforms to a communication standard such as LAN, USB, WI-FI (registered trademark), or BLUETOOTH (registered trademark).

Regarding Payment Processing of POS Terminal 2

The CPU 31 of the POS terminal 2 registers a merchandise identification code, a merchandise name, and the price of merchandise in the accounting merchandise list of the RAM 33 each time the merchandise identification code, the merchandise name, and the price of the merchandise are received from the merchandise registration device 1. In addition, the CPU 31 calculates the total purchase price of the merchandise in the accounting merchandise list. The CPU 31 displays the merchandise name of the merchandise, the price of each merchandise, and the total purchase price of the merchandise which is registered in the accounting merchandise list, in the third display unit 38 and the fourth display unit 39. In addition, the CPU 31 recognizes the deposit amount which is the amount of money received by an operator of the POS terminal 2 from a user in response to an operation signal supplied from the operation unit 37. The CPU 31 performs payment processing, based on the deposit amount and the total purchase price. In a case where the CPU 31 performs the payment processing, results of the payment processing are printed by the printer 40. In addition, in a case where the payment processing is completed, the CPU 31 controls the drawer 5 such that the drawer 5 is opened. In addition, furthermore, the CPU 31 transmits the results of the payment processing to the store computer 6 via the communication device 41.

Regarding Merchandise Registration Processing of Merchandise Registration Device 1

The CPU 11 of the merchandise registration device 1 executes a merchandise registration program to recognize and register the merchandise. The CPU 11 registers merchandise that has been identified by transmitting the merchandise identification code, the merchandise name, and the price of the recognized merchandise to the POS terminal 2. The CPU 11 recognizes the merchandise by using any one of a first merchandise recognition method, a second merchandise recognition method, and a third merchandise recognition method.

According to the first merchandise recognition method, the CPU 11 acquires the merchandise identification code included in an image of the merchandise identification code captured by the image capturing unit 20, and recognizes the merchandise on the basis of the acquired merchandise identification code. That is, the CPU 11 functions as a merchandise recognition unit that acquires the merchandise identification code from the image and recognizes the merchandise on the basis of the acquired merchandise identification code.

According to the second merchandise recognition method, the CPU 11 calculates feature data from an image of the merchandise captured by the image capturing unit 20, and extracts a merchandise candidate from the merchandise recognition dictionary on the basis of the calculated feature data. For example, the CPU 11 calculates a similarity between the feature data of each merchandise in the merchandise recognition dictionary and the feature data extracted from the image, and extracts the merchandise candidates in descending order of the calculated similarities. For example, the CPU 11 extracts a predetermined number of the merchandise candidates in descending order of the calculated similarities. In addition, for example, the CPU 11 extracts merchandise for which the calculated similarity exceeds a predetermined value, as a merchandise candidate. The CPU 11 displays the extracted merchandise candidate in the first display unit 18 in a selectable state, and recognizes the merchandise in accordance with an operation of selecting one of the merchandise candidates.

According to the third merchandise recognition method, the CPU 11 calculates feature data from the image of the merchandise captured by the image capturing unit 20, and specifies and recognizes one piece of merchandise from the merchandise recognition dictionary on the basis of the calculated feature data. For example, the CPU 11 calculates a similarity between the feature data of each merchandise in the merchandise recognition dictionary and the feature data extracted from the image, and automatically recognizes the merchandise according to the highest similarity which is calculated. That is, even in a case where reading of the merchandise identification code and operation of selecting the merchandise candidate are not performed, the CPU 11 functions as an automatic confirmation unit that calculates the feature data from the image and automatically recognizes the merchandise in accordance with the similarity between the calculated feature data and the feature data of each merchandise in the merchandise recognition dictionary.

The CPU 11 of the merchandise registration device 1 switches a method used for recognizing the merchandise between the first merchandise recognition method, the second merchandise recognition method, and the third merchandise recognition method, depending on features of the merchandise which are to be registered. In a case where the merchandise identification code can be acquired, the CPU 11 recognizes the merchandise by using the first merchandise recognition method. In addition, in a case where the merchandise identification code cannot be acquired, the CPU 11 recognizes the merchandise by either the second merchandise recognition method or the third merchandise recognition method.

Merchandise which is processed by the merchandise registration device 1 includes, for example, merchandise (first merchandise type) on which a merchandise identification code is provided and merchandise (second merchandise type) on which a merchandise identification code is not provided. The first merchandise type is, for example, an item having a package. The second merchandise type is, for example, fruit and vegetable without a package.

Since the merchandise identification code is not provided on the second merchandise type, the second merchandise type is not recognized by the first merchandise recognition method. Therefore, the CPU 11 recognizes the second merchandise type by using the second merchandise recognition method or the third merchandise recognition method.

In contrast to this, since the merchandise identification code is provided on the first merchandise type, the first merchandise type can be recognized by any of the first merchandise recognition method, the second merchandise recognition method, and the third merchandise recognition method. However, since the third merchandise recognition method automatically specifies merchandise with the highest similarity between the feature data calculated from the image and the feature data of the merchandise recognition dictionary, there is a possibility of misrecognition. In order to prevent misrecognition from occurring, it is preferable that the CPU 11 recognizes the first merchandise type by using the first merchandise recognition method or the second merchandise recognition method.

Therefore, the CPU 11 of the merchandise registration device 1 identifies whether the merchandise is the first merchandise type or the second merchandise type, and in a case that the merchandise is the first merchandise type, the merchandise is recognized by the first merchandise recognition method or the second merchandise recognition method, and not by the third merchandise recognition method. For this reason, the CPU 11 calculates the feature data from an image of the appearance of the merchandise, and performs identification of the merchandise whether the merchandise of the image is the first merchandise type or the second merchandise type, based on the calculated feature data and the aforementioned merchandise type identification dictionary. That is, the CPU 11 functions as a merchandise type identification unit which identifies whether the merchandise of the image is the first merchandise type on which the merchandise identification code is provided or the second merchandise type on which the merchandise identification code is not provided, based on the image.

The feature data used for merchandise type identification is, for example, a multidimensional vector. Specifically, the CPU 11 calculates a histogram of oriented gradient (HOG) feature data from the image of the appearance of the merchandise.

Since the first merchandise type has, for example, a package, there are features such as many straight lines. Since the second merchandise type is fruit, vegetable and the like, there are features such as few straight lines. For this reason, a group of feature data calculated from a plurality of images of the first merchandise type and a group of feature data calculated from a plurality of images of the second merchandise type are biased in a multidimensional space.

The merchandise type identification dictionary has a hyperplane (identification surface) in a multidimensional space which separates a group of the feature data calculated from a plurality of images of the first merchandise type and a group of the feature data calculated from a plurality of images of the second merchandise type onto a first merchandise type side and a second merchandise type side. The identification surface is set in advance by the learning model such as a support vector machine, based on the group of the feature data calculated from the plurality of images of the first merchandise type and the group of the feature data calculated from the plurality of images of the second merchandise type.

Based on where the feature data of the multidimensional vector generated from the image of the appearance of the merchandise is plotted in the aforementioned multidimensional space, the CPU 11 estimates whether the merchandise is the first merchandise type or the second merchandise type, depending on which side of the identification surface the plotted point exists. For example, in a case where the plotted point exists on the first merchandise type side of the identification surface, the CPU 11 estimates that the merchandise is the first merchandise type. In addition, for example, the CPU 11 estimates that the merchandise is the second merchandise type, in a case where the plotted point exists on the second merchandise type side of the identification surface.

As described above, in a case where one image in which the merchandise is captured is acquired from the image capturing unit 20, the CPU 11 determines whether or not the merchandise identification code can be acquired from the image. In a case where the merchandise identification code cannot be acquired, the CPU 11 estimates from appearance features of the merchandise whether the merchandise is the first merchandise type or the second merchandise type. In a case where it is estimated that the merchandise is the first merchandise type, the CPU 11 recognizes the merchandise by using the second merchandise recognition method without performing the third merchandise recognition method.

Figure 3:
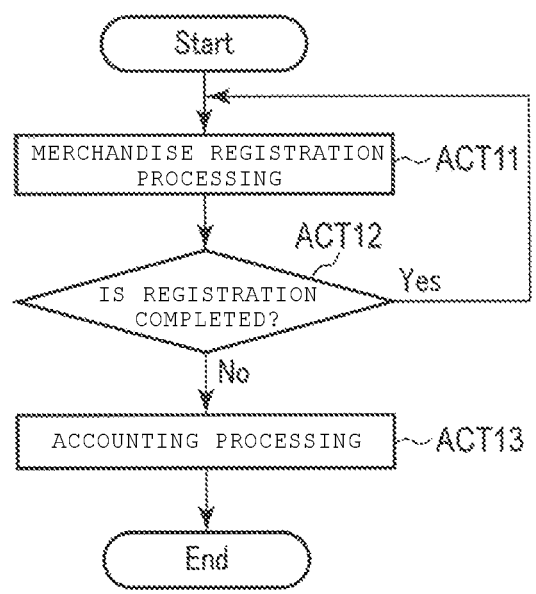
FIG. 3 illustrates an example sequence of operations of the merchandise registration device and the POS terminal.

FIG. 3 illustrates an example sequence of operations of the merchandise registration device 1 and the POS terminal 2. The merchandise registration device 1 and the POS terminal 2 performs registration and accounting of the merchandise held within the image capturing range of the image capturing unit 20 by an operator. First, the CPU 11 of the merchandise registration device 1 performs merchandise registration processing, based on the image acquired by the image capturing unit 20 (ACT 11). The CPU 31 of the POS terminal 2 calculates the total price each time merchandise is newly registered in the accounting merchandise list by the ACT 11.

The CPU 11 determines whether or not the merchandise registration processing is completed (ACT 12). For example, in a case where an operation of performing the payment processing is performed in the POS terminal 2 by the operator, the CPU 11 determines that the merchandise registration processing is completed. The operation of performing the payment processing is, for example, an operation of buttons for performing input of the deposit amount and the payment, an operation of selecting other payment methods other than cash, or the like. The CPU 11 repeatedly performs the processing of ACT 11 until the merchandise registration processing is completed.

In a case where it is determined that the merchandise registration processing is completed, the CPU 31 of the POS terminal performs the payment processing (ACT 13) and ends the processing. For example, the CPU 31 calculates a change amount by subtracting the total price of the merchandise registered in the accounting merchandise list from the deposit amount, displays the change amount in the third display unit 38, the fourth display unit 39, and the like, and opens the drawer 5.

Figure 4:
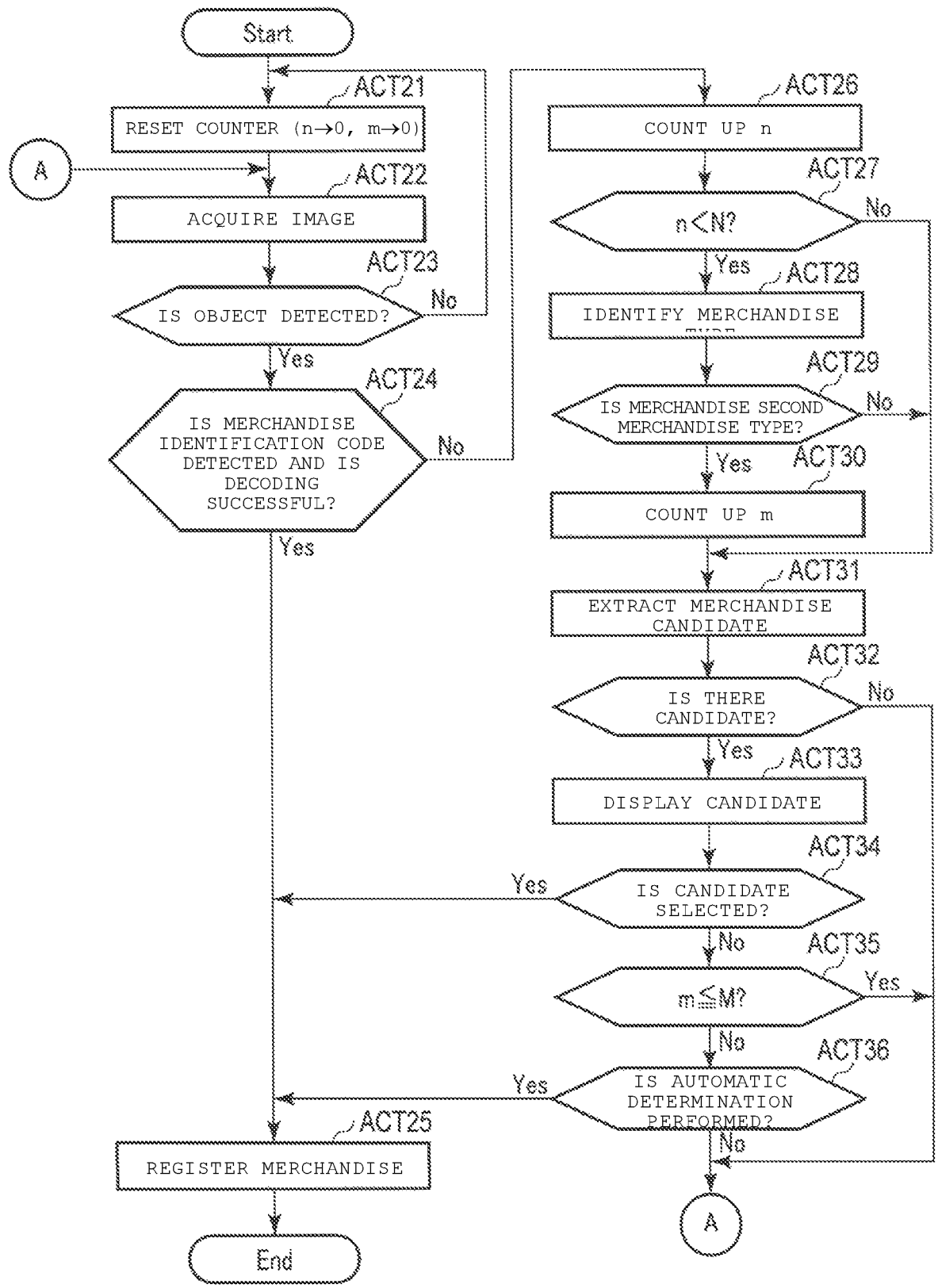
FIG. 4 illustrates an example sequence of operations for merchandise registration processing by the merchandise registration device according to the first embodiment.

FIG. 4 illustrates an example of the merchandise registration processing of ACT 11 of FIG. 3. The CPU 11 of the merchandise registration device 1 stores, for example, a counter n and a counter m in the RAM 13 or the like. The counter n counts the number of images (frames) which are captured by the image capturing unit 20 and from which objects are detected. The counter m counts the number of images (frames) which are identified that the merchandise is the second merchandise type. The CPU 11 may be configured to store the counter n and the counter m in the nonvolatile memory 14.

When the merchandise registration processing is performed, the CPU 11 first resets values of the counter n and the counter m to "0" (ACT 21).

The CPU 11 acquires an image of one frame captured by the image capturing unit 20 (ACT 22).

The CPU 11 performs processing of detecting an object in the image by performing image analysis with respect to the acquired image. The CPU 11 determines whether or not an object is detected (ACT 23). In a case where an object is not detected (ACT 23, NO), the CPU 11 returns to ACT 21.

In a case where an object is detected (ACT 23, YES), the CPU 11 performs processing to detect a merchandise identification code from the acquired image. The CPU 11 detects the merchandise identification code from the image and determines whether or not decoding is successful (ACT 24).

In a case where it is determined that the merchandise identification code is detected from the image and decoding is successful (ACT 24, YES), the CPU 11 extracts a merchandise name and the price which are associated with the decoded merchandise identification code from the merchandise recognition dictionary, performs merchandise registration for registering the merchandise identification code, the merchandise name, and the price in the POS terminal 2 (ACT 25), and ends the processing. That is, in a case where it is determined that the merchandise identification code is detected from the image and decoding is successful, the CPU 11 recognizes the merchandise by using the first merchandise recognition method and registers the merchandise in the POS terminal 2.

In addition, in ACT 24, in a case where it is determined that the merchandise identification code cannot be detected from the image or decoding fails (ACT 24, NO), the CPU 11 counts up (for example, increases by 1) the value of the counter n (ACT 26).

The CPU 11 determines whether or not a value of the counter n is less than "N" which is a preset value (ACT 27). In a case where the value of the counter n is not less than "N" which is the preset value, that is, the value of the counter n reaches "N" (ACT 27, NO), the CPU 11 proceeds to ACT 31 which will be described below.

In a case where it is determined that the value of the counter n is less than "N" which is the preset value (ACT 27, YES), the CPU 11 performs merchandise type identification for identifying a type of the merchandise (ACT 28).

The CPU 11 refers to results of the merchandise type identification and determines whether or not the merchandise is the second merchandise type (ACT 29). In a case where the CPU 11 determines that the merchandise is not the second merchandise type (ACT 29, NO), the processing proceeds to ACT 31 which will be described below.

In a case where the CPU 11 determines that the merchandise is the second merchandise type (ACT 29, YES), the CPU 11 counts up (for example, increases by 1) a value of the counter m (ACT 30).

Next, the CPU 11 extracts a merchandise candidate (ACT 31). For example, the CPU 11 calculates feature data from the image of the merchandise captured by the image capturing unit 20, calculates a similarity between the calculated feature data and the feature data of each merchandise in the merchandise recognition dictionary, and extracts one or more merchandise candidates in accordance with the calculated similarity.

The CPU 11 determines whether or not the merchandise candidate is extracted in ACT 31 (ACT 32). In a case where the CPU 11 determines that the merchandise candidate is not extracted (ACT 32, NO), the processing proceeds to ACT 22, and the CPU 11 acquires an image of a next frame.

In a case where it is determined that the merchandise candidate is extracted (ACT 32, YES), the CPU 11 displays the extracted merchandise candidate(s) in the first display unit 18 in a selectable state (ACT 33). For example, the CPU 11 displays a merchandise name of the extracted merchandise candidate in the first display unit 18 in the selectable state. In addition, for example, an image of each merchandise may be stored in the merchandise recognition dictionary. In this case, the CPU 11 may display an image of the extracted merchandise candidate in the first display unit 18 in the selectable state.

The CPU 11 determines whether or not one merchandise candidate is selected on a merchandise candidate screen displayed in ACT 33 (ACT 34).

In a case where the CPU 11 determines that the merchandise candidate is selected on the merchandise candidate screen (ACT 34, YES), the processing proceeds to ACT 25, and the CPU 11 registers the merchandise identification code, the merchandise name, and the price of the selected merchandise candidate in the POS terminal 2.

In a case where it is determined that a merchandise candidate is not selected in the merchandise candidate screen (ACT 34, NO), the CPU 11 determines whether or not the value of the counter m is less than or equal to "M" which is a preset value (ACT 35). In a case where the value of the counter m exceeds "M", the CPU 11 determines that there is a high possibility that the merchandise is the second merchandise type (that is, fruit and vegetable). In addition, in a case where the value of the counter m is less than or equal to "M", the CPU 11 determines that a possibility in which the merchandise is the second merchandise type is not sufficient.

In a case where the CPU 11 determines that the value of the counter m is less than or equal to "M" (ACT 35, YES), the processing proceeds to the processing of ACT 22 and the CPU 11 acquires an image of a next frame. That is, the CPU 11 continues to acquire the image, and continues the processing until detection of the barcode, selection of the merchandise candidate, or recognition of the merchandise according to automatic confirmation can be made.

In a case where it is determined that the value of the counter m is not less than or equal to "M", that is, the value of the counter m exceeds "M" in ACT 35 (ACT 35, NO), the CPU 11 determines whether or not to perform the automatic confirmation (ACT 36). The CPU 11 determines whether to perform the automatic confirmation, depending on an operation of the operation unit 37 or information received from the POS terminal 2. For example, the CPU 11 stores setting indicating whether to perform automatic confirmation in the RAM 13, the nonvolatile memory 14 or the like. The CPU 11 determines whether or not to perform the automatic confirmation with reference to the setting. In a case where the CPU 11 determines that the setting is to not perform the automatic confirmation (ACT 36, NO), the processing proceeds to ACT 22.

In a case where the CPU 11 determines that automatic confirmation is performed (ACT 36, YES), the processing proceeds to ACT 25. In this case, the CPU 11 recognizes the merchandise, based on the similarity calculated so far. For example, the CPU 11 calculates a similarity between the feature data calculated from the image and the feature data of each merchandise in the merchandise recognition dictionary, for each frame, integrates the similarities of a plurality of frames acquired after the object is detected, and recognizes the merchandise based on the highest similarity among the integrated similarities of each merchandise. The CPU 11 registers the merchandise identification code, the merchandise name, and the price of the recognized merchandise in the POS terminal 2.

In the above configuration, in a case where a frame rate of the acquired image of the image capturing unit 20 is set to 30 fps, the value "N" is set to 10, and the value M is set to "7", the automatic confirmation is suspended at least seven frames after the object is detected.

As described above, in a case where the merchandise identification code is not read out, the CPU 11 of the merchandise registration device 1 performs the merchandise type identification for identifying whether the merchandise is the first merchandise type such as a merchandise in a package on which the merchandise identification code is provided or the merchandise is the second merchandise type such as fruit and vegetable on which the merchandise identification code is not provided, for each frame. The CPU 11 performs the merchandise type identification over a plurality of frames and, in a case where it is determined that the number m of frames which are identified to be the second merchandise type exceeds "M" which is the preset value, the CPU 11 determines that the merchandise is the second merchandise type, and recognizes the merchandise according to the automatic confirmation. That is, the CPU 11 suspends recognizing the merchandise according to the automatic confirmation until it is determined that the merchandise is the second merchandise type. In other words, in a case where it is determined that there is a high possibility in which the merchandise is the first merchandise type, the CPU 11 continues to suspend recognizing the merchandise according to the automatic confirmation, and recognizes the merchandise through merchandise recognition according to reading of the merchandise identification code or the merchandise recognition according to selection of the merchandise candidate. Thereby, the merchandise registration device 1 can prevent the first merchandise type on which the merchandise identification code is provided from being recognized by the automatic confirmation. As a result, it is possible to provide a merchandise registration device and a merchandise registration program which can recognize and register merchandise with high accuracy.

Second Embodiment

Next, the merchandise registration device 1 according to a second embodiment will be described. Since a hardware configuration thereof is the same as the hardware configuration of the merchandise registration device 1 according to the first embodiment, description of the hardware configuration will be omitted.

Figure 5:
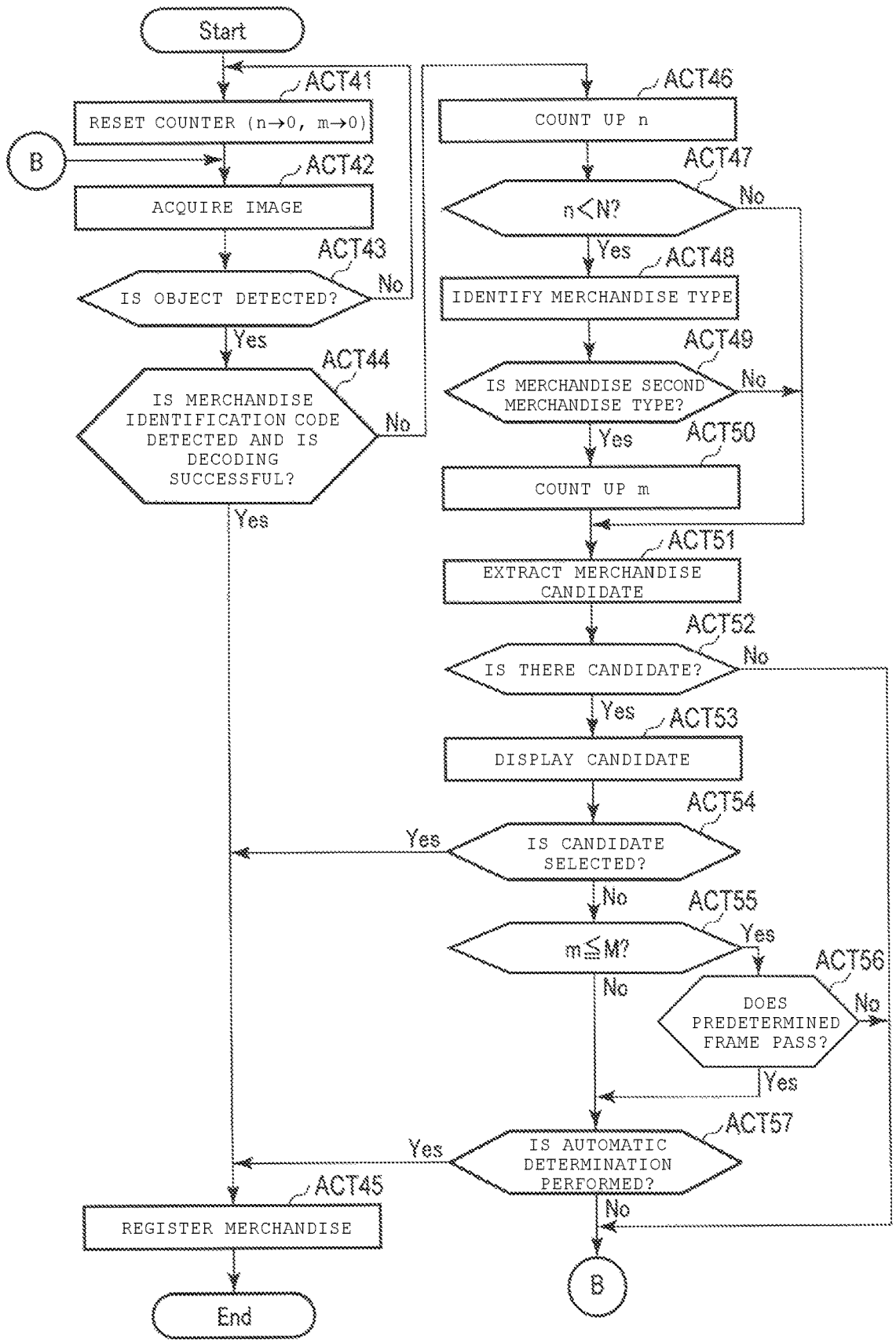
FIG. 5 illustrates an example sequence of operations for merchandise registration processing by the merchandise registration device according to a second embodiment.

FIG. 5 illustrates an example of merchandise registration processing according to the second embodiment of ACT 11 of FIG. 3. Since ACT 41 to ACT 54 are the same as ACT 21 to ACT 34 in FIG. 4, description thereof will be briefly made.

When the merchandise registration processing is performed, the CPU 11 first resets values of the counter n and the counter m to "0" (ACT 41).

The CPU 11 acquires an image of one frame captured by the image capturing unit 20 (ACT 42).

The CPU 11 performs processing of detecting an object of the image by performing image analysis with respect to the acquired image. The CPU 11 determines whether or not an object is detected (ACT 43). In a case where no object is detected (ACT 43, NO), the CPU 11 returns to ACT 41.

In a case where an object is detected (ACT 43, YES), the CPU 11 performs processing to detect a merchandise identification code from the acquired image. The CPU 11 detects the merchandise identification code from the image and determines whether or not decoding is successful (ACT 44).

In a case where it is determined that the merchandise identification code is detected from the image and decoding is successful (ACT 44, YES), the CPU 11 extracts a merchandise name and the price which are associated with the decoded merchandise identification code from the merchandise recognition dictionary, performs merchandise registration for registering the merchandise identification code, the merchandise name, and the price in the POS terminal 2 (ACT 45), and ends the processing.

In addition, in ACT 44, in a case where it is determined that the merchandise identification code cannot be detected from the image or decoding fails (ACT 44, NO), the CPU 11 counts up (for example, increases by 1) the value of the counter n (ACT 46).

The CPU 11 determines whether or not a value of the counter n is less than "N" which is a preset value (ACT 47). In a case where the CPU 11 determines that the value of the counter n is not less than "N" which is the preset value, that is, the value of the counter n reaches "N" (ACT 47, NO), the processing proceeds to ACT 51 which will be described below.

In a case where it is determined that the value of the counter n is less than "N" which is the preset value (ACT 47, YES), the CPU 11 performs merchandise type identification for identifying a type of the merchandise (ACT 48).

The CPU 11 determines whether or not the merchandise is the second merchandise type with reference to results of the merchandise type identification (ACT 49). In a case where the CPU 11 determines that the merchandise is not the second merchandise type (ACT 49, NO), the processing proceeds to ACT 51 which will be described later below.

In a case where the CPU 11 determines that the merchandise is the second merchandise type (ACT 49, YES), the CPU 11 counts up (for example, increases by 1) a value of the counter m (ACT 50).

Next, the CPU 11 performs processing to extract one or more merchandise candidates (ACT 51).

The CPU 11 determines whether or not the merchandise candidate is extracted in ACT 51 (ACT 52). In a case where the CPU 11 determines that the merchandise candidate is not extracted (ACT 52, NO), the processing proceeds to the processing of ACT 42 and the CPU 11 acquires an image of a next frame.

In a case where it is determined that the merchandise candidate is extracted (ACT 52, YES), the CPU 11 displays the extracted merchandise candidate in the first display unit 18 in a selectable state (ACT 53).

The CPU 11 determines whether or not any merchandise candidate is selected on a merchandise candidate screen displayed in ACT 53 (ACT 54).

In a case where the CPU 11 determines that the merchandise candidate is selected on the merchandise candidate screen (ACT 54, YES), the processing proceeds to ACT 45, and the CPU 11 registers a merchandise identification code, a merchandise name, and the price of the selected merchandise candidate in the POS terminal 2.

In a case where it is determined that a merchandise candidate is not selected on the merchandise candidate screen (ACT 54, NO), the CPU 11 determines whether or not the value of the counter m is less than or equal to "M" which is the preset value (ACT 55). In a case where the value of the counter m exceeds "M", the CPU 11 determines that there is a high possibility that the merchandise is the second merchandise type (that is, fruit and vegetable). In addition, in a case where the value of the counter m is less than or equal to "M", the CPU 11 determines that a possibility in which the merchandise is the second merchandise type is not sufficient.

In a case where it is determined that the value of the counter m is less than or equal to "M" (ACT 55, YES), the CPU 11 determines whether or not a predetermined frame passes (ACT 56). That is, the CPU 11 determines whether or not the number n of frames, which is the number of frames after an object is detected from the image in the ACT 43, reaches a preset number "X" of frames. In a case where the CPU 11 determines that the predetermined frame does not pass X (ACT 56, NO), the processing proceeds to the processing of ACT 42 and the CPU 11 acquires an image of a next frame. That is, the CPU 11 acquires the image of the next frame and continues the processing.

In a case where it is determined that the value of the counter m is not less than or equal to "M", that is, the value of the counter m exceeds "M" in ACT 55 (ACT 55, NO) or in a case where it is determined that the predetermined frame passes X in the ACT 56 (ACT 56, YES), the CPU 11 determines whether or not to perform automatic confirmation (ACT 57). In a case where the CPU 11 determines that setting is not to perform the automatic confirmation (ACT 57, NO), the processing proceeds to ACT 42.

In a case where the CPU 11 determines that the automatic confirmation is performed (ACT 57, YES), the processing proceeds to ACT 45. In this case, the CPU 11 specifies and recognizes of the merchandise, based on the similarity calculated so far. For example, the CPU 11 calculates the similarity between the feature data calculated from the image and the feature data of each merchandise in the merchandise recognition dictionary for each frame, integrates the similarities of a plurality of frames acquired after the object is detected, and specifies and recognizes the merchandise corresponding to the highest similarity among the integrated similarities of each merchandise. The CPU 11 registers the merchandise identification code, the merchandise name, and the price of the recognized merchandise in the POS terminal 2.

In the above configuration, for example, in a case where it is assumed that the number "X" of frames is 30, the merchandise identification code is not read, the merchandise candidate is not selected, and the merchandise is not identified as the second merchandise type, the CPU 11 suspends the automatic confirmation processing until the number of frames in which the object is detected reaches 30 frames.

As described above, even in a case where the merchandise identification code is not read, the merchandise candidate is not selected, and the merchandise is not identified as the second merchandise type, and in a case where the number of frames (suspended time) in which the object is detected reaches the number of frames (predetermined time) which is preset, the CPU 11 of the merchandise registration device 1 recognizes the merchandise in accordance with the automatic confirmation. That is, in a case where it is determined that the merchandise is the second merchandise type, or in a case where a certain period of time passes, the merchandise registration device 1 performs merchandise recognition according to the automatic confirmation. Thereby, the merchandise registration device 1 can adjust time to pass without performing recognition of the merchandise. As a result, the merchandise registration device 1 can efficiently register the merchandise.

In the above embodiment, description is made that the merchandise registration device 1 is configured to identify whether the merchandise in the image is the first merchandise type or the second merchandise type, based on an identification surface defined in a multidimensional space by a support vector machine, but the description is not limited to the configuration. The merchandise registration device 1 may be configured to identify whether the merchandise is the first merchandise type or the second merchandise type by using another method. For example, the merchandise registration device 1 may be configured to identify whether the merchandise is the first merchandise type or the second merchandise type by using the Deep Neural Network or the like.

In addition, in the above embodiment, description is made in which, in a case where the number m of frames in which the merchandise identifies as the second merchandise type exceeds "M" which is a preset value, the merchandise registration device 1 is configured to determine that the merchandise is the second merchandise type, but the description is not limited to the configuration. The merchandise registration device 1 may be configured to identify whether the merchandise is the first merchandise type or the second merchandise type, based on an added value of a distance between the identification surface defined in the multidimensional space by the support vector machine and a point obtained by plotting feature data generated from the image in the multidimensional space.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity registration apparatus comprising:
   an image capturing unit that captures an image of a commodity;
   a memory that stores a commodity recognition dictionary having feature data corresponding to each of a plurality of commodities; and
   a processor configured to:
      determine whether a commodity identification code can be acquired from the captured image,
      upon determining that the commodity identification code cannot be acquired from the captured image, determine, based on a number of straight lines of a shape of the commodity in the captured image, whether the commodity is of a first commodity type which is a manufactured product or of a second commodity type which is not a manufactured product,
      upon determining that the commodity is of the second commodity type, perform an automatic commodity recognition process that does not require confirmation from an operator and includes:
         calculating feature data from the captured image of the commodity, and
         recognizing the commodity by comparing the calculated feature data and the feature data stored in the commodity recognition dictionary, and
      perform a registration process for a transaction with respect to the commodity recognized by the automatic commodity recognition process.

2. The commodity registration apparatus according to claim 1, wherein
   the processor also performs the automatic commodity recognition process when an elapsed time from the capturing of the image of the commodity reaches a predetermined time.

3. The commodity registration apparatus according to claim 1, wherein
   the commodity of the first commodity type includes the commodity identification code,
   the commodity of the second commodity type does not include the commodity identification code, and
   the processor is further configured to:
      upon determining that the commodity identification code can be acquired from the captured image, acquire the commodity identification code from the image and recognize the commodity based on the acquired commodity identification code, and
      perform the registration process for the transaction with respect to the recognized commodity.

4. The commodity registration apparatus according to claim 1, wherein
   the number of straight lines of the shape is determined from feature data calculated from the captured image of the commodity.

5. The commodity registration apparatus according to claim 1, further comprising:
   a display, wherein
   the processor is further configured to:
      upon determining that the commodity is of the first commodity type and a commodity identification code cannot be acquired, perform a commodity candidate recognition process including calculating feature data from the captured image of the commodity and identifying one or more candidate commodities by comparing the calculated feature data and the feature data stored in the commodity recognition dictionary,
      control the display device to display the candidate commodities, and
      upon receipt of a confirmation input from the operator selecting one of the candidate commodities, perform the registration process for the transaction with respect to the selected candidate commodity.

6. The commodity registration apparatus according to claim 1, wherein the commodity of the second commodity type is a fruit or a vegetable.

7. The commodity registration apparatus according to claim 1, wherein a commodity of the first commodity type includes more straight lines than a commodity of the second commodity type.

8. A commodity registration method comprising:
   storing a commodity recognition dictionary having feature data corresponding to each of a plurality of commodities;
   capturing an image of a commodity;
   determining whether a commodity identification code can be acquired from the captured image;
   upon determining that the commodity identification code cannot be acquired from the captured image, determining, based on a number of straight lines of a shape of the commodity in the captured image, whether the commodity is of a first commodity type which is a manufactured product or of a second commodity type which is not a manufactured product;
   upon determining that the commodity is of the second commodity type, performing an automatic commodity recognition process that does not require confirmation from an operator and includes:
      calculating feature data from the captured image of the commodity, and
      recognizing the commodity by comparing the calculated feature data and the feature data stored in the commodity recognition dictionary; and performing a registration process for a transaction with respect to the commodity recognized by the automatic commodity recognition process.

9. The method according to claim 8, wherein
the automatic commodity recognition process is also performed when an elapsed time from the capturing of the image of the commodity reaches a predetermined time.

10. The method according to claim 8, wherein
the commodity of the first commodity type includes the commodity identification code,
the commodity of the second commodity type does not include the commodity identification code, and
the method further comprises:
upon determining that the commodity identification code can be acquired from the captured image, acquiring the commodity identification code from the image and recognizing the commodity based on the acquired commodity identification code; and
performing the registration process for the transaction with respect to the recognized commodity.

11. The method according to claim 8, wherein
the number of straight lines of the shape is determined from feature data calculated from the captured image of the commodity.

12. The method according to claim 8, further comprising:
upon determining that the commodity is of the first commodity type and a commodity identification code cannot be acquired, performing a commodity candidate recognition process including calculating feature data from the captured image of the commodity and identifying one or more candidate commodities by comparing the calculated feature data and the feature data stored in the commodity recognition dictionary;
displaying on a display the candidate commodities;
receiving a confirmation input from the operator selecting one of the candidate commodities; and
performing the registration process for the transaction with respect to the selected candidate commodity.

13. The commodity registration method according to claim 8, wherein the commodity of the second commodity type is a fruit or a vegetable.

14. The commodity registration method according to claim 8, wherein a commodity of the first commodity type includes more straight lines than a commodity of the second commodity type.

15. A non-transitory computer readable medium containing a program that causes a computer to perform a commodity registration method comprising:
storing a commodity recognition dictionary having feature data corresponding to each of a plurality of commodities;
capturing an image of a commodity;
determining whether a commodity identification code can be acquired from the captured image;
upon determining that the commodity identification code cannot be acquired from the captured image, determining, based on a number of straight lines of a shape of the commodity in the captured image, whether the commodity is of a first commodity type which is a manufactured product or of a second commodity type which is not a manufactured product;
upon determining that the commodity is of the second commodity type, performing an automatic commodity recognition process that does not require confirmation from an operator and includes:
calculating feature data from the captured image of the commodity, and
recognizing the commodity by comparing the calculated feature data and the feature data stored in the commodity recognition dictionary; and
performing a registration process for a transaction with respect to the commodity recognized by the automatic commodity recognition process.

16. The non-transitory computer readable medium according to claim 15, wherein
the automatic commodity recognition process is also performed when an elapsed time from the capturing of the image of the commodity reaches a predetermined time.

17. The non-transitory computer readable medium according to claim 16, wherein the commodity of the second commodity type is a fruit or a vegetable.

18. The non-transitory computer readable medium according to claim 15, wherein
the commodity of the first commodity type includes the commodity identification code,
the commodity of the second commodity type does not include the commodity identification code, and
the method further comprises:
upon determining that the commodity identification code can be acquired from the captured image, acquiring the commodity identification code from the image and recognizing the commodity based on the acquired commodity identification code; and
performing the registration process for the transaction with respect to the recognized commodity.

19. The non-transitory computer readable medium according to claim 15, wherein
the number of straight lines of the shape is determined from feature data calculated from the captured image of the commodity.

20. The non-transitory computer readable medium according to claim 15, wherein
the method further comprises:
upon determining that the commodity is of the first commodity type and a commodity identification code cannot be acquired, performing a commodity candidate recognition process including calculating feature data from the captured image of the commodity and identifying one or more candidate commodities by comparing the calculated feature data and the feature data stored in the commodity recognition dictionary;
displaying on a display the candidate commodities;
receiving a confirmation input from the operator selecting one of the candidate commodities; and
performing the registration process for the transaction with respect to the selected candidate commodity.

* * * * *